(12) United States Patent
Miller et al.

(10) Patent No.: US 11,824,383 B2
(45) Date of Patent: Nov. 21, 2023

(54) PORTABLE POWER CHARGER WITH AIR COMPRESSOR

(71) Applicant: Halo2Cloud, LLC, Glastonbury, CT (US)

(72) Inventors: Garold C. Miller, Hartford, CT (US); Nathan Daniel Weinstein, Hartford, CT (US); Troy Starkey, Hartford, CT (US); Michael Silva, Hartford, CT (US)

(73) Assignee: Bollinger Industries, Inc., Roanoke, TX (US)

( * ) Notice: Subject to any disclaimer, the term of this patent is extended or adjusted under 35 U.S.C. 154(b) by 237 days.

(21) Appl. No.: 17/060,722

(22) Filed: Oct. 1, 2020

(65) Prior Publication Data

US 2021/0091578 A1 Mar. 25, 2021

Related U.S. Application Data

(60) Continuation of application No. 29/685,204, filed on Mar. 27, 2019, now Pat. No. Des. 911,936, and a
(Continued)

(51) Int. Cl.
*H02J 7/00* (2006.01)
*G06F 1/26* (2006.01)
(Continued)

(52) U.S. Cl.
CPC ............... *H02J 7/0031* (2013.01); *B60S 5/04* (2013.01); *B60S 5/046* (2013.01); *G06F 1/26* (2013.01);
(Continued)

(58) Field of Classification Search
CPC ............................ H02J 7/342; B60S 5/04–046
(Continued)

(56) References Cited

U.S. PATENT DOCUMENTS

| 3,259,754 A | 7/1966 | Matheson |
| 4,286,172 A | 8/1981 | Millonzi et al. |

(Continued)

FOREIGN PATENT DOCUMENTS

| CN | 2659752 Y | 12/2004 |
| CN | 2803825 Y | 8/2006 |

(Continued)

OTHER PUBLICATIONS

Amazon version of Stanley J5C09 Manual, accessed at <https://m.media-amazon.com/images/I/A17FVZTaTBL.pdf>, published on Jul. 23, 2021, for product first available on Nov. 16, 2009. (Year: 2021).*

(Continued)

*Primary Examiner* — David V Henze-Gongola
(74) *Attorney, Agent, or Firm* — Lathrop GPM LLP; Wm. Tucker Griffith

(57) ABSTRACT

A multi-functional, portable device for use in situations where electricity is not available or convenient is disclosed. A portable safety device includes a power charger and air compressor that may safely jump start a vehicle and recharge portable electronic devices, such as phones and laptop computers, as well as inflate vehicle tires or other inflatable objects, when a standard external power source is not convenient. It may also be used for providing an emergency light source.

18 Claims, 12 Drawing Sheets

Related U.S. Application Data continuation-in-part of application No. 15/999,394, filed on Aug. 20, 2018, now Pat. No. 10,840,716, which is a division of application No. 14/848,668, filed on Sep. 9, 2015, now Pat. No. 10,075,000.

(60) Provisional application No. 62/047,884, filed on Sep. 9, 2014.

(51) Int. Cl.
*H02J 7/34* (2006.01)
*B60S 5/04* (2006.01)

(52) U.S. Cl.
CPC .............. *G06F 1/263* (2013.01); *H02J 7/007* (2013.01); *H02J 7/0047* (2013.01); *H02J 7/342* (2020.01); *H02J 7/00* (2013.01)

(58) Field of Classification Search
USPC .................................................. 320/104–105
See application file for complete search history.

(56) References Cited

U.S. PATENT DOCUMENTS

| | | |
|---|---|---|
| 4,638,236 A | 1/1987 | Carr et al. |
| 4,840,583 A | 6/1989 | Moore |
| 4,897,044 A | 1/1990 | Rood |
| 4,905,742 A * | 3/1990 | Mohs ...................... B60S 5/043 152/416 |
| 4,938,712 A | 7/1990 | Black |
| 4,969,834 A | 11/1990 | Johnson |
| 5,230,637 A | 7/1993 | Weber |
| 5,435,759 A | 7/1995 | Adams et al. |
| 5,601,452 A | 2/1997 | Ruffa |
| 5,795,182 A | 8/1998 | Jacob |
| 5,901,056 A | 5/1999 | Hung |
| 5,921,809 A | 7/1999 | Fink |
| 5,984,718 A | 11/1999 | James |
| 6,148,888 A * | 11/2000 | Loureiro Benimeli ...................... B60C 23/0433 141/95 |
| 6,212,054 B1 | 4/2001 | Chan |
| 6,254,426 B1 | 7/2001 | Iacovelli et al. |
| 6,362,599 B1 | 3/2002 | Turner et al. |
| 6,471,540 B1 | 10/2002 | Fernandez |
| D494,541 S | 8/2004 | Hriscu et al. |
| 6,896,544 B1 | 5/2005 | Kuelbs et al. |
| 6,921,286 B1 | 7/2005 | Fernandez |
| D520,502 S | 5/2006 | Yu |
| 7,148,580 B2 | 12/2006 | Sodemann et al. |
| D568,312 S | 5/2008 | Wang |
| D575,729 S | 8/2008 | Nomi |
| D578,960 S | 10/2008 | Fisher |
| D587,267 S | 2/2009 | Wang |
| D590,769 S | 4/2009 | Tatehata |
| D612,329 S | 3/2010 | Guccione |
| D628,535 S | 12/2010 | Cheng |
| D629,746 S | 12/2010 | Workman |
| D631,838 S | 2/2011 | Cheng |
| D641,362 S | 7/2011 | Dublin |
| D643,807 S | 8/2011 | Jiang |
| D650,738 S | 12/2011 | Leung |
| 8,076,900 B1 | 12/2011 | Brown |
| D651,564 S | 1/2012 | Workman |
| D661,249 S | 6/2012 | Smith |
| 8,199,024 B2 | 6/2012 | Baxter et al. |
| D662,878 S | 7/2012 | Fahrendorff |
| D665,732 S | 8/2012 | Saito |
| D667,788 S | 9/2012 | Mai |
| D676,380 S | 2/2013 | Sun |
| 8,376,755 B2 | 2/2013 | Rinehardt |
| D682,197 S | 5/2013 | Leung |
| D682,777 S | 5/2013 | Gupta |
| D686,150 S | 7/2013 | Lee |
| D686,153 S | 7/2013 | Qu |
| D688,200 S | 8/2013 | Shin |
| D693,768 S | 11/2013 | Alesi et al. |
| D695,214 S | 12/2013 | Roberts |
| D700,139 S | 2/2014 | Chan |
| D701,490 S | 3/2014 | Inskeep |
| D701,838 S | 4/2014 | Esses |
| D705,719 S | 5/2014 | Wong |
| D708,129 S | 7/2014 | Houghton |
| D708,571 S | 7/2014 | Ji |
| D711,318 S | 8/2014 | Xinfang |
| D714,214 S | 9/2014 | Wikel |
| D719,506 S | 12/2014 | Jung |
| D721,646 S | 1/2015 | Kim |
| D722,018 S | 2/2015 | Wang |
| D722,961 S | 2/2015 | Lin et al. |
| D724,080 S | 3/2015 | Lin |
| D727,257 S | 4/2015 | Miller et al. |
| 9,007,015 B1 | 4/2015 | Nook et al. |
| D730,280 S | 5/2015 | Koehler |
| D733,043 S | 6/2015 | Hasbrook |
| D735,158 S | 7/2015 | Zhu |
| D735,403 S | 7/2015 | Che |
| D739,347 S | 9/2015 | Huang |
| 9,153,985 B1 | 10/2015 | Gjovik |
| D742,312 S | 11/2015 | Gupta et al. |
| D743,333 S | 11/2015 | Nomi |
| D743,889 S | 11/2015 | Lyles |
| D748,055 S | 1/2016 | Lee |
| D751,984 S | 3/2016 | Lin |
| D751,985 S | 3/2016 | Curry |
| 9,312,707 B2 | 4/2016 | Stewart |
| 9,368,912 B1 | 6/2016 | Sullivan |
| D762,169 S | 7/2016 | Lei |
| D764,404 S | 8/2016 | Lau et al. |
| D769,188 S | 10/2016 | Miller et al. |
| 9,461,376 B1 | 10/2016 | Bakhoum |
| D770,976 S | 11/2016 | Ku |
| 9,506,446 B2 | 11/2016 | Xinfang |
| D773,431 S | 12/2016 | Holzer |
| D782,974 S | 4/2017 | Ju |
| D786,192 S | 5/2017 | Liu |
| D786,790 S | 5/2017 | Miller et al. |
| 9,653,933 B2 | 5/2017 | Inskeep |
| D792,409 S | 7/2017 | Shim |
| D797,044 S | 9/2017 | Miller |
| D797,663 S | 9/2017 | Miller |
| D803,151 S | 11/2017 | Zhou |
| D803,779 S | 11/2017 | Jung |
| 9,819,113 B2 | 11/2017 | Adams et al. |
| D808,972 S | 1/2018 | Magi |
| D813,803 S | 3/2018 | Massar |
| D814,412 S | 4/2018 | Georgiades |
| D815,036 S | 4/2018 | Martorell |
| D816,029 S | 4/2018 | Dai |
| D816,606 S | 5/2018 | Georgiades |
| D819,022 S | 5/2018 | Shim |
| D821,972 S | 7/2018 | Wei |
| D822,655 S | 7/2018 | Akana |
| D824,328 S | 7/2018 | Liu |
| D824,329 S | 7/2018 | Conocenti |
| D825,455 S | 8/2018 | Liu |
| D829,719 S | 10/2018 | Shim |
| 10,110,055 B2 * | 10/2018 | Inskeep ................... H02J 7/342 |
| D833,411 S | 11/2018 | Castle |
| D836,543 S | 12/2018 | Sun |
| D837,790 S | 1/2019 | Wu |
| D838,669 S | 1/2019 | Miller et al. |
| D843,998 S | 3/2019 | Bolotin |
| D844,560 S | 4/2019 | Miller |
| D847,112 S | 4/2019 | Castle |
| D847,811 S | 5/2019 | Shim |
| D851,586 S | 6/2019 | Liu |
| D853,322 S | 7/2019 | Xu |
| D853,958 S | 7/2019 | Lei |
| D853,959 S | 7/2019 | Miller |
| D862,385 S | 10/2019 | Turksu |
| D864,969 S | 10/2019 | Magi |
| D864,970 S | 10/2019 | Magi |

(56) References Cited

U.S. PATENT DOCUMENTS

| | | |
|---|---|---|
| D867,368 S | 11/2019 | Magi |
| D867,369 S | 11/2019 | Magi |
| 2004/0121225 A1 | 6/2004 | Krieger et al. |
| 2004/0196888 A1 | 10/2004 | Musbach et al. |
| 2005/0040788 A1 | 2/2005 | Tseng |
| 2006/0145655 A1 | 7/2006 | Sheng |
| 2006/0202664 A1 | 9/2006 | Lindsey et al. |
| 2007/0285049 A1 | 12/2007 | Krieger et al. |
| 2008/0169044 A1 | 7/2008 | Osborne et al. |
| 2008/0203966 A1 | 8/2008 | Ward |
| 2008/0238356 A1 | 10/2008 | Batson et al. |
| 2009/0042460 A1 | 2/2009 | Schey et al. |
| 2009/0230783 A1 | 9/2009 | Weed et al. |
| 2010/0301800 A1 | 12/2010 | Inskeep |
| 2011/0066895 A1 | 3/2011 | Windell et al. |
| 2011/0287673 A1 | 11/2011 | Fan et al. |
| 2012/0068662 A1 | 3/2012 | Durando et al. |
| 2012/0091944 A1 | 4/2012 | Rogers |
| 2012/0235629 A1 | 9/2012 | Wood |
| 2013/0026709 A1 | 1/2013 | Sampson et al. |
| 2013/0049675 A1 | 2/2013 | Minami |
| 2013/0154543 A1 | 6/2013 | Richardson et al. |
| 2014/0139175 A1 | 5/2014 | Gonzalez |
| 2014/0152787 A1 | 6/2014 | Listou |
| 2014/0159509 A1 | 6/2014 | Inskeep |
| 2014/0227967 A1 | 8/2014 | Savage |
| 2014/0308995 A1 | 10/2014 | Wu |
| 2015/0054336 A1 | 2/2015 | Xinfang |
| 2015/0091392 A1 | 4/2015 | Hwang |
| 2015/0123620 A1 | 5/2015 | Nowak |
| 2015/0130400 A1 | 5/2015 | Inskeep |
| 2015/0288205 A1 | 10/2015 | Weinstein et al. |
| 2016/0049819 A1* | 2/2016 | Butler .................. B60L 58/25 320/105 |
| 2016/0052409 A1 | 2/2016 | Sun et al. |
| 2016/0072323 A1 | 3/2016 | Miller |
| 2016/0072329 A1 | 3/2016 | Miller |
| 2016/0111692 A1 | 4/2016 | Morita |
| 2016/0181587 A1 | 6/2016 | Koebler et al. |
| 2016/0197504 A1 | 7/2016 | Hsia |
| 2016/0218336 A1 | 7/2016 | Hermann |
| 2016/0303989 A1 | 10/2016 | Lei |
| 2016/0308379 A1 | 10/2016 | Pan |
| 2016/0308382 A1 | 10/2016 | Pan |
| 2016/0347136 A1* | 12/2016 | Scott ...................... B60C 29/06 |
| 2016/0359352 A1 | 12/2016 | Chiu |
| 2017/0012448 A1 | 1/2017 | Miller et al. |
| 2017/0110766 A1 | 4/2017 | Koebler |
| 2017/0317492 A1 | 11/2017 | Koebler |

FOREIGN PATENT DOCUMENTS

| | | | |
|---|---|---|---|
| CN | 201472270 U | 5/2010 | |
| CN | 102177385 A * | 9/2011 | .............. F02B 63/04 |
| CN | 203211234 U | 9/2013 | |
| CN | 203707839 U | 7/2014 | |
| CN | 104118374 A | 10/2014 | |
| GB | 2527858 A * | 1/2016 | .............. B60L 53/14 |

OTHER PUBLICATIONS

Manualzz version of Stanley J5C09 Manual, accessed at <https://manualzz.com/doc/en/22503600/stanley-j5c09-500-instant--1000-peak-amp-jump-starter-ins . . . >, published on Mar. 11, 2013 (Year: 2013).*

Machine translation of CN-102177385-A (Year: 2023).*

PowerAll®, product list obtained from url: https://www.thepowerall.com/shop, originally obtained from internet archive with waybackmachine http://www.powerall.com/product, Jun. 1, 2014.

Horizon Hobby, "E-flite EC3 Device & Battery Connector, Male/Female by E-flite (EFLAEC303)", obtained from url: https://www.horizonhobby.com/product/connector-ec3-device-and-ec3-battery-set/EFLAEC303.html, originally downloaded from file history of U.S. Appl. No. 12/496,292, published on May 29, 2009, filed with the Jul. 1, 2009 IDS.

* cited by examiner

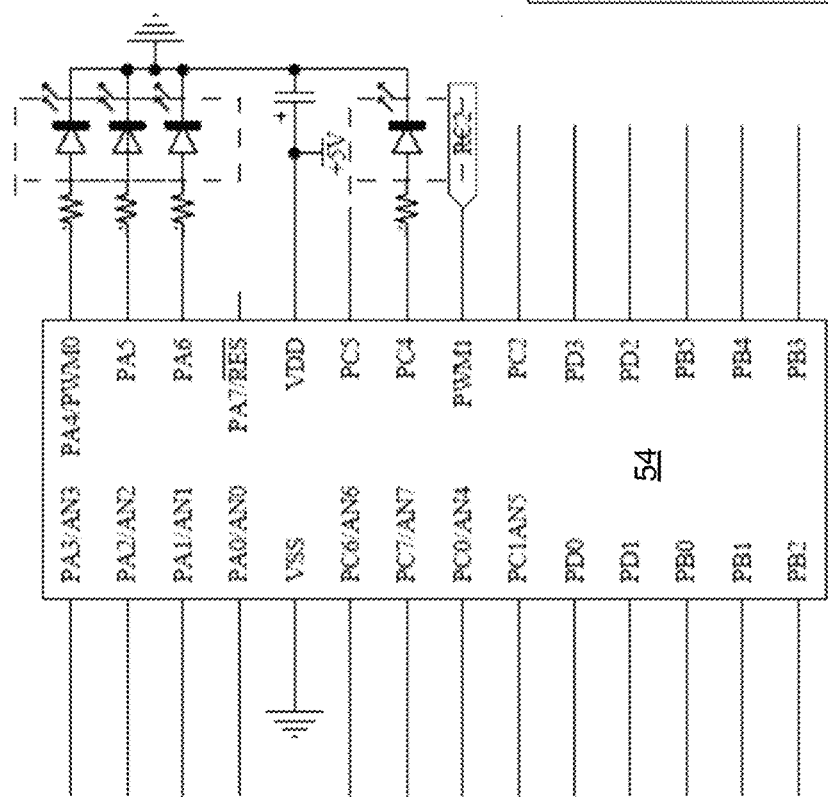
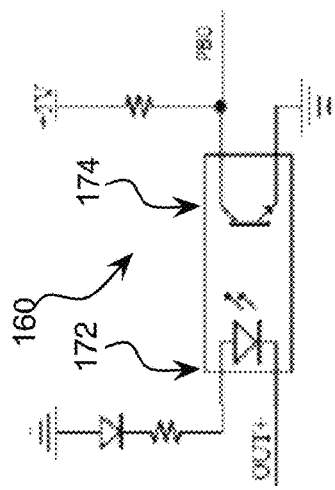
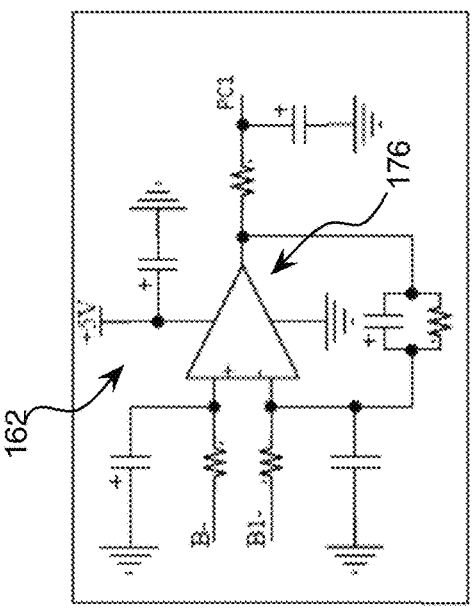
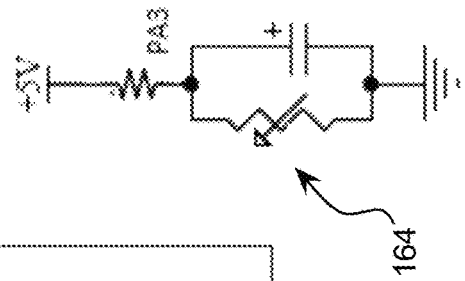
FIG. 9
FIG. 10
FIG. 11
FIG. 12

PORTABLE POWER CHARGER WITH AIR COMPRESSOR

CROSS REFERENCE TO RELATED APPLICATIONS

This application is a continuation of Design patent application Ser. No. 29/685,204, filed Mar. 27, 2019, and a continuation-in-part of U.S. patent application Ser. No. 15/999,394, filed Aug. 20, 2018, which is a divisional of U.S. patent application Ser. No. 14/848,668, filed Sep. 9, 2015, issued as U.S. Pat. No. 10,075,000, which claims priority to U.S. Provisional Patent Application Ser. No. 62/047,884, filed Sep. 9, 2014, each of which is incorporated by reference herein in its entirety.

TECHNICAL FIELD OF THE INVENTION

The present invention generally relates to portable safety devices, and more particularly relates to multi-functional, portable safety devices having a battery charger and an air compressor for use in situations where electricity is not available or convenient.

BACKGROUND OF THE INVENTION

Consumers may encounter a variety of circumstances requiring a powered device while in a location lacking a wall outlet or similar power source. For example, a portable power charger is especially useful when walking, camping, at the park, at the mall, or at a sporting event, where one may need to use a phone in an emergency. In other situations, such as those involving a vehicle breakdown, a consumer may have other needs, such as the need for automotive repair or to fix a flat tire, or the need for a light source. Accordingly, a portable safety device that provides power and other functions and is easy to transport without taking up too much space is desirable.

Portable power chargers are currently available on the market having a variety of shapes, sizes and designs. Commonly, such power chargers have a limited battery capacity, and are therefore limited in what can be charged and how much charge can be provided. Typically, such portable battery chargers are designed for simply charging portable electronic devices, such as smart phones, portable music players, and possibly tablets. Few portable battery chargers are available for recharging laptop computers, as they may have insufficient power capacity in their own internal battery. Even fewer portable battery chargers are available for jump-starting car batteries, and those that are available on the market either are too big to transport in one's pocket, purse or bag, or simply cannot provide a sufficient amount of power to adequately jumpstart and recharge a car battery. Still further, such portable battery chargers typically do not include an air compressor, certainly one that would not compromise the size and portability of the charger.

Portable air compressors are also known, including devices that may be plugged into a typical wall outlet or similar power source, as well as those for use with a vehicle cigarette lighter, for example. However, there is a need for a device that will provide a variety of power, light and repair functions in a portable and convenient housing, along with battery charging functions, that overcomes the problems and drawbacks associated with such prior art devices.

In view of the foregoing, there is a need for a portable charger that can be used to charge a car battery, laptop computers and variety of portable electronic devices, including but not limited to smart phones, mobile phones, data tablets, music players, cameras, camcorders, gaming units, e-books, Bluetooth® headsets and earpieces, GPS devices, and the like, either individually or simultaneously in various combinations, while still being easily portable itself. Accordingly, there is a need for such a charger that has high charge capacity—i.e., on the order of 10,000 to 15,000 mAh—while still being portable, of a compact size, and easy to use in various conditions and locations to charge a car battery, charge a computer, and charge one or more electronic devices simultaneously, including but not limited to in a house or office, a car or an airplane, as well as on-the-go, without compromising operation, performance or appearance. Still further, there is a need for a portable charger that can be easily recharged from an external power source, providing increase flexibility and convenience of use for the portable charger. Even further, there is a need for such a portable charger that includes an air compressor for increased utility. Accordingly, it is a general object of the present invention to provide a portable charger that improves upon conventional power chargers currently on the market, especially car battery chargers, and that overcomes the problems and drawbacks associated with such prior art chargers.

SUMMARY OF THE INVENTION

The present invention generally relates to portable safety devices, and more particularly relates to a multi-functional, portable power charger and air compressor that may safely jump start a vehicle as well as inflate vehicle tires or other inflatables. A preferred portable safety device essentially comprises a combined portable power charger and air compressor that may be used for charging car batteries, portable electronic devices, and laptop computers when a standard external power source is not convenient.

In accordance with an aspect of the present invention, the portable safety device comprises a lightweight portable charger that is provided for charging various devices, including jump starting a car battery, charging laptop computers and a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. In general, such a portable power charger includes an internal rechargeable battery unit for connecting to and recharging one or more device in need of a power boost, as necessary, and at least one power connection port for connecting the charger unit with at least one such device, or an external power source, or both.

Additionally, the portable power charger may include one or more power connection ports that can act as power inputs, power outputs, or both, so as to be used for recharging the internal battery from an external power source connected to the charger via a connection port, or charge electronic devices connected to the charger via a connection port. The portable power charger may further be connected to an external power source and one or more electronic device at the same time, even using the same power connection port, without affecting operation of the charger to receive a charge from the external power source or supply a charge to the electronic devices.

In preferred embodiments of the present invention, the portable power charger is provided with a USB connection port, a DC connection port, and an ignition connection port. The USB connection port can act as a power output and is used for connecting the power charger with electronic devices and/or external power sources using appropriate charging cables and adapter units, as needed. In certain embodiments, multiple USB ports may be provided. Additionally, though shown and described as USB ports, the ports may use other known connection interfaces, such as micro-USB, mini-USB, Apple Lightning™, Apple 30-pin, or the like, without departing from the spirit and principles of the present invention.

The DC connection port can act as a power input and is used for connecting the portable power charger with external power sources using appropriate charging cables with AC/DC adapters, as needed. In an embodiment of the present invention, a separate DC input and DC output may be provided.

The ignition connection port is provided to connect the portable power charger to a car battery for jump starting using jumper cables with positive and negative alligator clips inserted into the port. In preferred embodiments, specially designed end cap is provided on the end of the jumper cables to mate with the socket of the ignition port.

In accordance with another aspect of the present invention, the portable power charger incorporates an air compressor that can be used to inflate tires or other inflatables. The air compressor is disposed within the charger housing and is capable of providing sufficiently pressurized air without compromising the compact size of the portable power charger. Further, the air pressure can be adjusted, improving functionality of the portable power charger. An air hose in operative communication with the air compressor is provided and can be stored within a storage cavity provided on the housing when not in use.

Portable power chargers in accordance with the designs described and illustrated herein are readily portable as a result of the small, compact size of the charger housing. Despite the small size of the portable power charger, the power capacity is very high so that the battery unit can accommodate a variety of devices in need of recharging, including multiple devices at the same time, if necessary. In preferred embodiments, the battery unit comprises a rechargeable Lithium-Ion battery having a power capacity in the range of about 57,165 mWh to about 57,720 mWh. Such power capacity allows the portable charger to also be used to charge portable electronic devices. Moreover, such a power capacity level makes the present invention especially suitable for jump-starting a car battery.

In embodiments of the present invention, the portable power charger also includes an emergency floodlight and other emergency lighting features, controlled by a power switch on the charger housing.

The portable power charger also includes a power indicator that will indicate the remaining capacity of the internal rechargeable battery unit in the portable power charger. For example, in an embodiment of the present invention, the power indicator means comprises a series of four LED lights, but can include more or fewer lights without departing from the principles and spirit of the present invention. When the battery is at "full" capacity—i.e., electric quantity between about 76% and about 100%—all the lights will be lit up. As the battery power decreases, the lights will correspondingly decrease by one as the power is used—e.g., three lights indicate electric quantity between about 51% and about 75%; two lights indicates electric quantity between about 26% and about 50%; and one light indicates electric quantity less than or equal to about 25%. Alternatively, the power indicator means can comprise a digital interface that provides a battery capacity level for the internal rechargeable battery unit, or another known means of providing battery level information.

The portable power charger also comprises a controller or microprocessor, including a processing unit, configured to execute instructions and to carry out operations associated with the power charger. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with the power indicator means to provide the user with information for how much capacity is remaining in the internal rechargeable battery unit and whether the charger needs to be connected to an external power source for recharging.

In certain embodiments of the portable power charger in accordance with the present invention, connector cables operatively communicating with the internal battery unit can be provided with the charger housing, and in some embodiments, storable within cavities formed in the charger housing from which they can be removed to connect to electronic devices in need of a recharge. Still further, such charging cables can be removable and replaceable so that varying connector interfaces—e.g., USB, Micro-USB, mini-USB, Apple Lightning, or Apple 30-pin—can be used with the portable power charger.

In certain embodiments of the portable power charger, a wireless transmitter and/or receiver can be included in the charger housing for wirelessly recharging the internal batteries of portable electronic devices that have an appropriate wireless receiver or wirelessly recharging the internal battery of the power charger from a wireless recharging station, such as designs shown and described in co-pending U.S. patent application Ser. No. 14/220,524, filed Mar. 20, 2014, and incorporated herein by reference.

Certain exemplary embodiments of the invention, as briefly described above, are illustrated by the following figures.

BRIEF DESCRIPTION OF THE DRAWINGS

FIG. 9 shows a microprocessor pinout for the portable safety device of FIG. 1.

FIG. 10 shows a reverse polarity detector for the portable safety device of FIG. 1.

FIG. 11 shows a reverse current protector for the portable safety device of FIG. 1.

FIG. 12 shows a temperature control circuit for the portable safety device of FIG. 1.

DETAILED DESCRIPTION OF PREFERRED EMBODIMENTS

Figure 1:
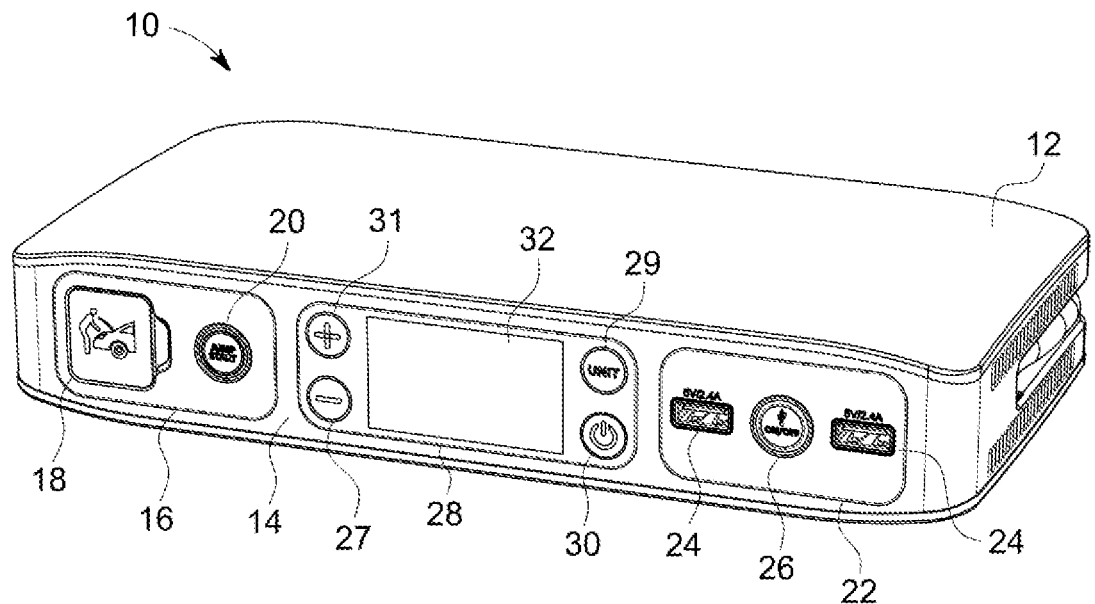
FIG. 1 shows a perspective view of a portable safety device in accordance with embodiments of the present invention.

In embodiments of the present invention, a portable safety device, generally designated by reference numeral 10, may be used to provide power for a variety of devices such as a car battery, laptop computers and portable electronic devices, including but not limited to smart phones, mobile phones, data tablets, music players, cameras, camcorders, gaming units, e-books, Bluetooth® headsets and earpieces, GPS devices, and the like, either individually or simultaneously in various combinations, while still being easily portable itself. The portable safety device 10 may also include additional features for emergency situations, including one or more light sources, such as a floodlight, task lighting and emergency signaling, and an air compressor for inflating vehicle tires or other inflatables.

Portable safety devices in accordance with the designs described and illustrated herein are readily portable due to the small, compact size of the charger housing. The power capacity is very high so that an internal battery unit can accommodate the various uses described below. For example, in embodiments, an internal battery unit 52 of the portable safety device 10 may be a rechargeable LiPo (lithium polymer) battery operating at a voltage of 11.1 V with charge capacity of approximately 5300 mAh.

FIG. 1 shows a perspective view of the portable safety device 10 in accordance with preferred embodiments of the present invention. Portable safety device 10 is essentially a combined portable power charger and air compressor adaptable to a variety of emergency uses, and includes a charger housing 12 that is generally rectangular, with upper and lower faces, front and back faces and two side faces. Although a shape and design of housing 12 is shown and described, other shapes are contemplated without departing from the spirit and principles of the present invention. Further, terms such as "upper," "lower," "front" and "back" are used for ease of describing device 10 and do not limit the use of device 10 to any particular orientation. Common reference numbers are used throughout the figures.

Many of the operative control functions are located on a front face 14 of housing 12, as generally illustrated in FIG. 1. For example, jump start controls 16 may be used when jump starting a 12V car battery. As illustrated, the jump start controls 16 include cable port 18, shown covered by a protective door, and a jump start button 20. The cable port 18 may include differently-shaped positive and negative 12 V jumper cables (not shown). In embodiments, jumper cables may include an EC5 connector.

Charging controls 22 include at least one 5V USB output port 24 for charging 5V portable electronic devices. The charging controls 22 also include an ON/OFF button 26. In embodiments of the present invention, air compressor controls 28 include several control buttons for use in operating the device 10, such as compressor ON/OFF button 30, "+" button 31 and "–" button 27 to increase or decrease air pressure or a UNIT button 29 to select what information is shown on display 32.

In preferred embodiments of the present invention, a user display 32 is provided. The display 32 may be an LCD screen as shown, for example, in FIG. 14. Operational data is generally displayed on the display 32 to facilitate use of portable safety device 10 by a user. The data provided on the display 32 relates to operation of the portable safety device 10 as a charger, as well as an air compressor. Various forms of the display showing salient information for operation of the portable safety device are illustrated in FIGS. 15-26, and discussed in more detail below. Any operational alerts associated with the functioning of the device 10—for example, failure of the safety check described herein, low battery, and low or high temperature—will be indicated on the display 32. Additionally, the display 32 can be used in connection with operation of an air compressor, generally illustrated in FIGS. 5A and 5B and designated as reference numeral 56. For example, the display 32 can provide pressure levels during use of said compressor 56. The type and arrangement of information provided on the display and illustrated in FIGS. 14-26 are for purposes of illustration only.

Figure 15:
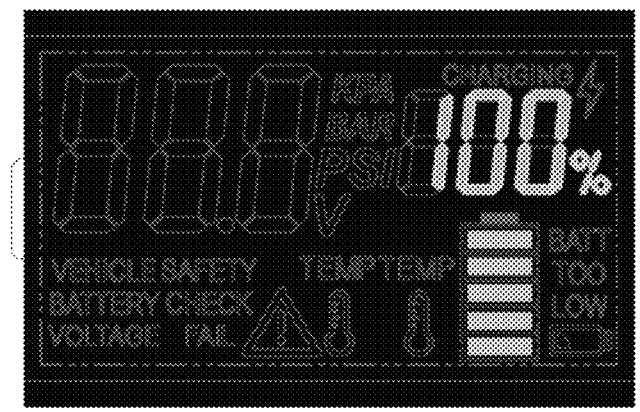
FIG. 15 shows the visual display of FIG. 14 illustrating the display provided when the internal battery unit is fully charged and ready for all uses.
Figure 16:
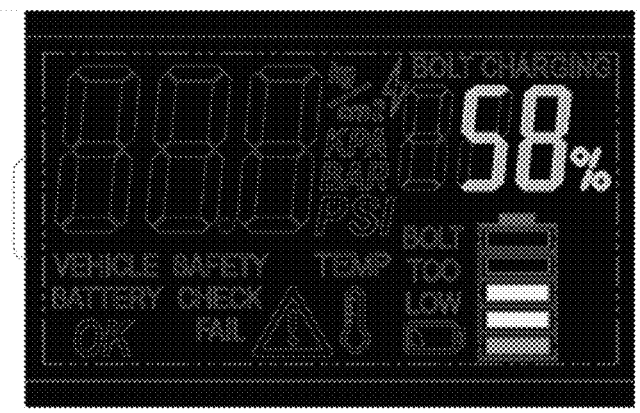
FIG. 16 shows the visual display of FIG. 14 illustrating the display provided when the internal battery unit is partially charged.
Figure 17:
FIG. 17 shows the visual display of FIG. 14 illustrating the display provided when the internal battery unit is low.

In embodiments of the device 10, the display 32 may include a power indicator 70 that will indicate the remaining capacity of the internal rechargeable battery unit 52 in the power charger 10. For example, the power indicator means comprises a series of five LED lights 74, but may include more or fewer lights without departing from the principles and spirit of the present invention. When the battery is at "full" capacity—i.e., electric quantity between about 76% and about 100%—all the lights will be lit up. As the battery power decreases, the lights will correspondingly decrease by one as the power is used, as illustrated in FIGS. 15-18. Additionally, the lights will change color as the capacity level decreases—for example, when fully charged, all lights will be green; when the battery is half full the lights that are lit-up will be yellow or a combination of yellow and red; when the battery is low, the lights that are lit-up will be red. Alternatively, display 32 may include a digital readout 72 that provides a battery capacity level for the internal rechargeable battery unit 52, or another known means of providing battery level information such as "Battery Too Low" message 76, as indicated in FIG. 17.

Other data provided on the display 32 may include a temperature warning indicator 78, a safety check fail indicator 80, and a vehicle battery OK indicator 82. These indicators may be used during jump starting a vehicle, or other operating conditions of portable safety device 10. In embodiments, a unit display 84 may be included and a digital readout area 86 may be used during operation of the air compressor 56, for, to select units and determine a set point for inflation of a vehicle tire or other inflatable object.

Although a specific arrangement of controls on front face 14 of the charger housing 12 is depicted, this arrangement is merely for illustration purposes and embodiments of the present invention are not limited to those shown and described herein. For example, jump start controls 16, charging controls 22 and control and display controls 28 may be arranged in a different order. Similarly, the charging controls 22 may include additional USB ports 24. Additionally, though shown and described as USB ports, the ports may use other known connection interfaces, such as micro-USB, mini-USB, Apple Lightning™, Apple 30-pin, for example. Additional or different control buttons may be provided as part of the air compressor controls 28.

Figure 2:
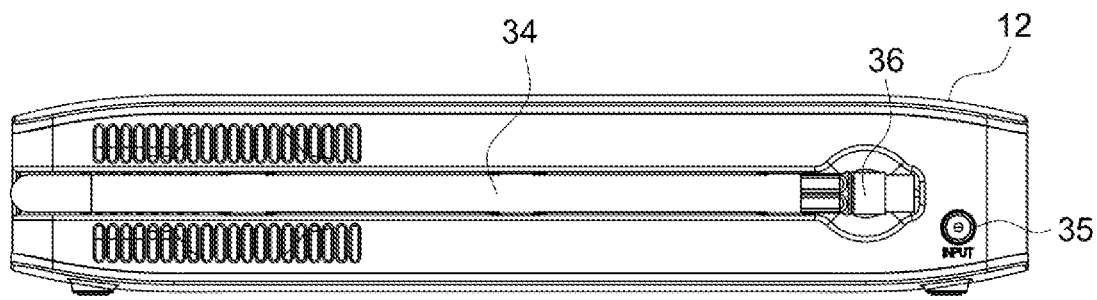
FIG. 2 shows a back planar view of the portable safety device of FIG. 1.
Figure 4:
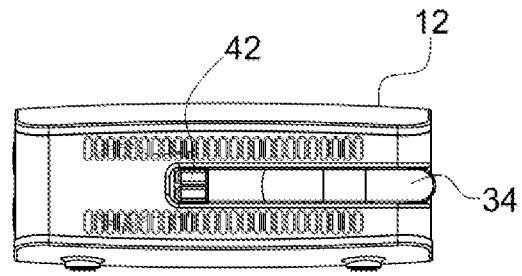
FIG. 4 shows a right-side planar view of the portable safety device of FIG. 1.

FIG. 2 shows a back planar view of an embodiment of the portable safety device 10 illustrated in FIG. 1. The charger housing 12 includes a recessed area defining a storage cavity for retaining an air compressor hose 34 with end fitting 36 for use with the air compressor 56 located inside the charger housing 12. An end of the hose 34 opposite to the end fitting 36 wraps around a corner of the charger housing 12 to one side, as shown in FIG. 4, to provide extra length for use of the air compressor 56. In alternate embodiments, the hose 34 can be extendable to increase the reach of the hose. Similarly, the hose would be retractable for storage in the storage cavity when the air compressor is not being used.

Still referring to FIG. 2, a DC input port 35 provides a connection for recharging the internal battery unit 52 of the portable safety device 10 via connection to external power sources using appropriate charging cables with AC/DC charging adaptors, as needed. In embodiments, the DC input port 35 is a barrel-type power connector with an operating voltage of approximately 14 VDC, an input current of approximately 850 mA and an input power of approximately 14 watts. The display 32 may show information indicating that device 10 is being charged and the charge percentage.

Figure 3:
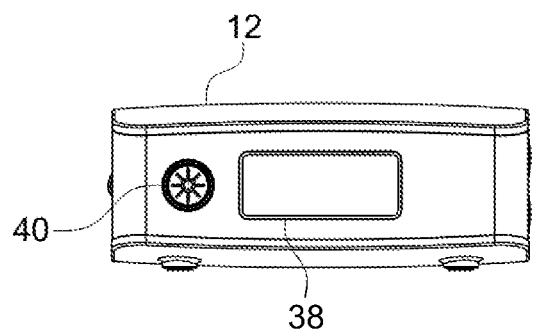
FIG. 3 shows a left-side planar view of the portable safety device of FIG. 1.

FIGS. 3 and 4 show side planar views of the portable safety device 10. FIG. 3 shows a floodlight 38 with an ON/OFF switch 40 for use in emergency situations. FIG. 4 shows the opposite side of portable safety device 10. As describe above, the hose 34 wraps around the back of the charger housing 12 and is stored within a storage cavity. The connection of the hose 34 to the charger housing is via a hinge 42. The hose 34 may be removed from the recessed storage cavity in the housing 12 by grasping the end fitting 36, for example, and pulling the hose 34 away from the housing 12 while a connection to the air compressor 56 is maintained by the hinge 42. In embodiments, the hinge 42 is not limited a specific configuration or range of movement but represents a flexible connection point between the hose 34 and the housing 12 that allows the hose 34 to be extended away from the housing 12 and maintains a connection between the hose 34 and the air compressor 56 inside the housing 12.

In alternate embodiments of the portable safety device 10, connector cables (not shown) operatively may be storable within cavities formed in the housing 12 from which they may be removed to connect to electronic devices in need of a recharge to the device 10. Still further, such charging cables can be removable and replaceable so that varying connector interfaces—e.g., USB, Micro-USB, mini-USB, Apple Lightning™, or Apple 30-pin—may be used with the portable safety device 10.

Figure 5A:
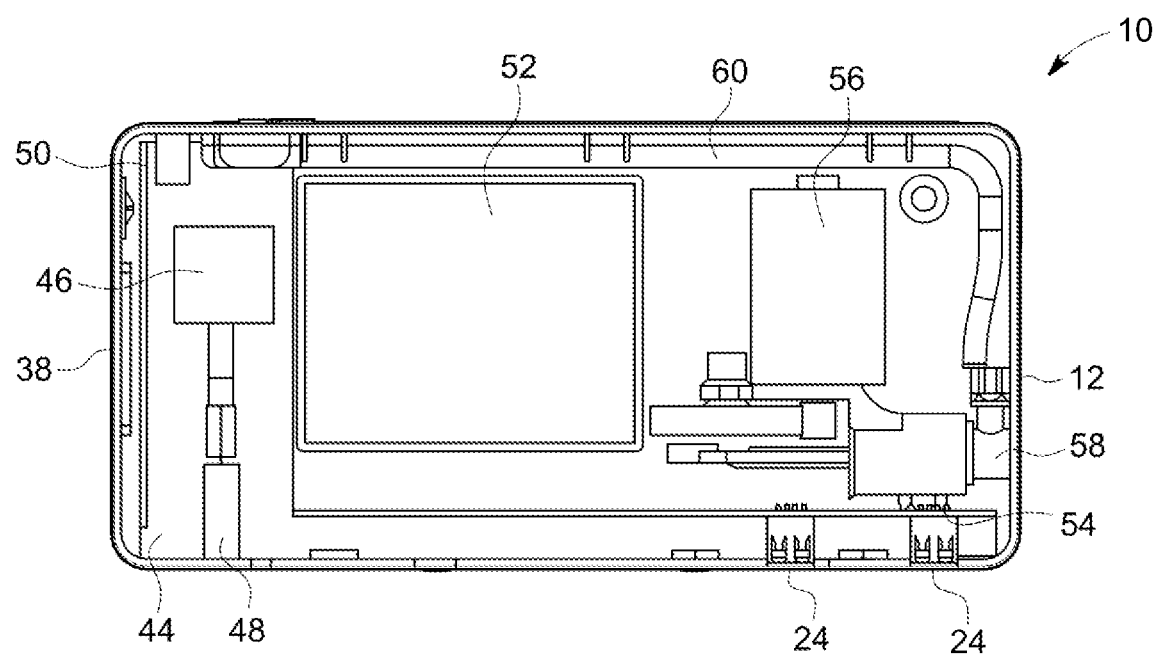
FIG. 5A shows a top interior view of the portable safety device of FIG. 1.
Figure 5B:
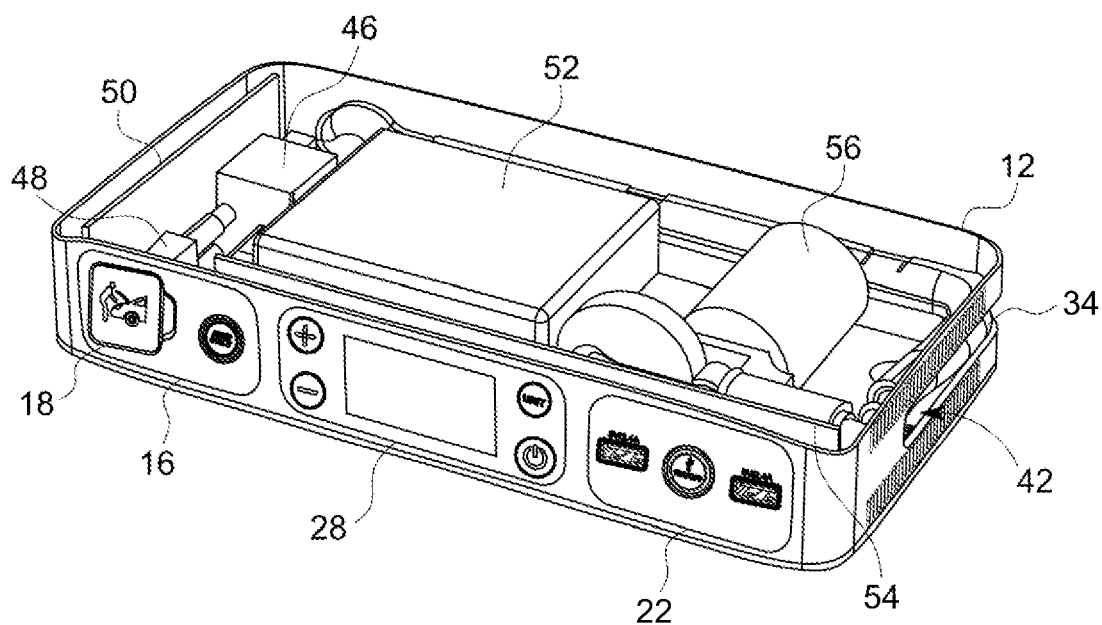
FIG. 5B shows a perspective view of FIG. 5A.

FIG. 5A shows a top interior view of the portable safety device 10 of FIG. 1 (with the cover removed). FIG. 5B shows a perspective view of FIG. 5A. These Figures should be referenced together in the following description. The portable safety device 10 includes several operative components inside the charger housing 12 situated for optimal functionality while being able to keep the size of the charger housing 12 small and portable. Printed circuit boards (PCBs) provide circuitry and control devices (not shown) which may include a controller, microprocessor, or any type of processing unit, configured to execute instructions and to carry out operations associated with the portable safety device 10. Main PCB 44 includes relay and power supply 46 and EC5 connector 48. EC5 connector 48 provides a connection to auxiliary jumper cables (not shown) through jumper cable port 18. Floodlight PCB 50 is shown adjacent to main PCB 44 and includes control circuity for operating floodlight 38. USB PCB 54 provides control circuitry for operating USB ports 24. Although three PCBs are shown and described, any number of PCBs may be used and circuitry to operate device 10 may be mounted on PCBs in a variety of ways.

A rechargeable internal battery unit 52 is disposed within the portable safety device 10 to provide power for operating the device 10 as a portable power charger. In an embodiment, the battery unit 52 comprises a 3×4000 mAh, 11.1V rechargeable battery pack. In embodiments, the device 10 includes control circuitry to monitor the temperature of an internal battery (described below) and restrict charging to the condition where the battery temperature is within a range greater than 0° C. and less than 45° C.

Figure 18:
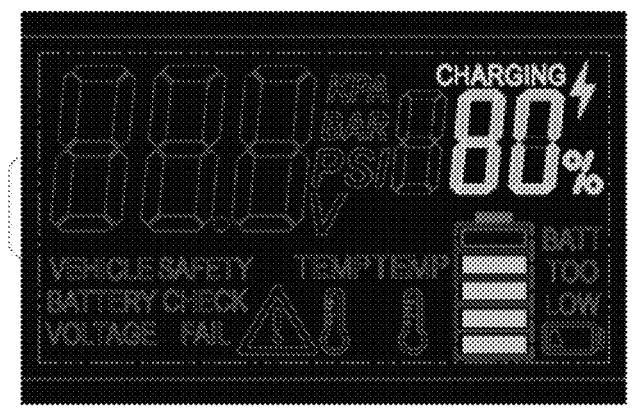
FIG. 18 shows the visual display of FIG. 14 illustrating the display provided when the internal battery unit is charging.

In embodiments, control circuitry may keep track of the capacity level of the battery unit, store data or provide a conduit means by which data can be exchanged between electronic devices, such as between a smart phone and a computer. The control circuitry may also communicate with the battery unit 52 to determine how much capacity is remaining in the battery. Upon determining the capacity level, the processing unit may communicate with the power indicator means to provide the user with information for how much capacity is remaining in the internal rechargeable battery unit and whether the charger needs to be connected to an external power source for recharging. For example, if the internal battery unit 52 needs to be charged, a "Battery Too Low" indicator will be provided on the LCD display 32 along with the low battery visual indicator and the specific charge percentage remaining in the battery, as illustrated in FIG. 17. Similarly, if the device 10 is connected to an external power source for recharging the internal battery unit 52, the display will provide an indication that the battery is charging along with the specific charge percentage for the battery 52, as illustrated in FIG. 18.

Embodiments and operation of the outputs provided by a portable safety device 10 will now be described.

Charging Operation

The charging controls 22 for the device 10 include, for example, two USB ports 24. In embodiments, USB port 24 is a USB type A 5 VDC 2.4 Amp USB port. As noted above, other types of charging ports may be provided. ON/OFF button 26 controls use of USB port 24. In further embodiments, USB ON/OFF button 26 may illuminate and an internal battery capacity percentage may be displayed on the LCD screen 32 while the USB port 24 is being used. Further, the device 10 may monitor the USB port 24 and automatically shut off following 30 minutes of inactivity. The USB port 24 may also be active when the device 10 is being charged from an external power source. Additional features to protect the device 10 and the internal battery unit 52 may be incorporated, such as automatically powering off the device 10 once it detects that the battery 52 cannot supply adequate USB output. Similarly, back feeding prevention may not allow the internal battery 52 to be charged via any USB port 24 to ensure that the battery is not overcharged.

Jump Start Operation

The jump start controls 16 for the device 10 include the cable port 18 for connecting jumper cables to the device 10. In embodiments, the cable port 18 may provide up to 500 amps cranking current when connected to a vehicle battery that measures between 1+1−0.5 VDC−12.8+1−0.3 VDC at its terminals with a high current output maximum of approximately 4 seconds. In embodiments, the jump start button 20 includes an LED capable of operating in steady state or flashing mode in at least two colors. For the purposes of the discussion below, it will be assumed that the jump start button 20 may display the following status indicators:

Green flashing LED: jump start safety test state.
Green steady LED: Jump start ignition ready state.
Red rapid flash LED: Jump start safety fault.

In embodiments, jump start functionality of the device 10 may include several safety checks, assessed in connection with a safety circuit 150, described in more detail below, such as:

Reverse Polarity Protection—Ensures that jumper cables are always properly connected to a vehicle's battery terminals. The jump start button 20 may rapid flash red if cables are not connected properly and not allow a jump start attempt.

Reverse Current Protection—Detects if the vehicle battery is attempting to back feed the device 10, which may automatically shut off if this condition is detected. Reverse current protection will generally shut off the device 10, or alternately prevent the device from being activated, if the safety circuit 150 detects a value of 10 Amps or greater in the reverse direction. The device 10 may also shut off if it detects a value of 10 Amps+/2 Amp in the reverse direction for 3 seconds maximum. Anything greater than 12 Amps for 3 seconds continuous (within battery manufacturers max charge rate specification) may result in an automatic shut off.

Over Voltage Protection—Detects if the vehicle battery voltage is greater than 12.8V+/−0.3V. If this condition is met, the device 10 may automatically shut off the jump start visual indicator and not allow a jump start attempt.

Low Voltage Protection—Detects if the vehicle battery voltage is less than 1V+/−0.5V. The jump start button 20 may continue to flash green if this condition is detected and not allow a jump start attempt.

Short Circuit Protection—May not allow inadvertent connection of the positive and negative jump start cables prior to a jumpstart attempt. The jump start button 20 may continue to flash green when the measured voltages fall outside the allowable range (less than 1V+/−0.5V or greater than 12.8V+/−0.3V).

Jumper Cable Spark Protection—The device 10 may only allow a cold jump start connection. This eliminates the potential of sparking while connecting and disconnecting jumper cables.

Timer Circuit Protection—Detects that valid jump start conditions are met and will only allow a 4 second max, high output jump start. Once 4 seconds have elapsed, the device 10 may automatically shut off.

Embodiments of the present invention may include other safety features in addition to those described above. A flashing green safety check sequence may last approximately four seconds prior to jump start. Once acceptable jump start conditions are met, the jump start button 20 will immediately become solid GREEN following safety check sequence. In further embodiments, other operational conditions may be monitored, including maximum time allowed from time of solid green to time of first jump start attempt of 3 minutes, maximum time allowed during flashing green sequence of 3 minutes or minimum battery charge state which will allow jump start attempt of 50% or 11.0V+/−0.5V. In embodiments, a preferred mode to abort a jump start attempt if jump start button 20 is in steady GREEN mode is to push jump start button 20 again, which will shut off device 10.

The jump start button 20 and the compressor ON/OFF button 30 may rapid flash RED if a constant current draw is greater than 20 amps for 30 seconds. If this condition is met, the device 10 may automatically power off after 30 seconds.

The device 10 may also automatically power off once it detects that vehicle has started or car battery voltage higher than 12.8V+/−0.3V.

Figure 6:
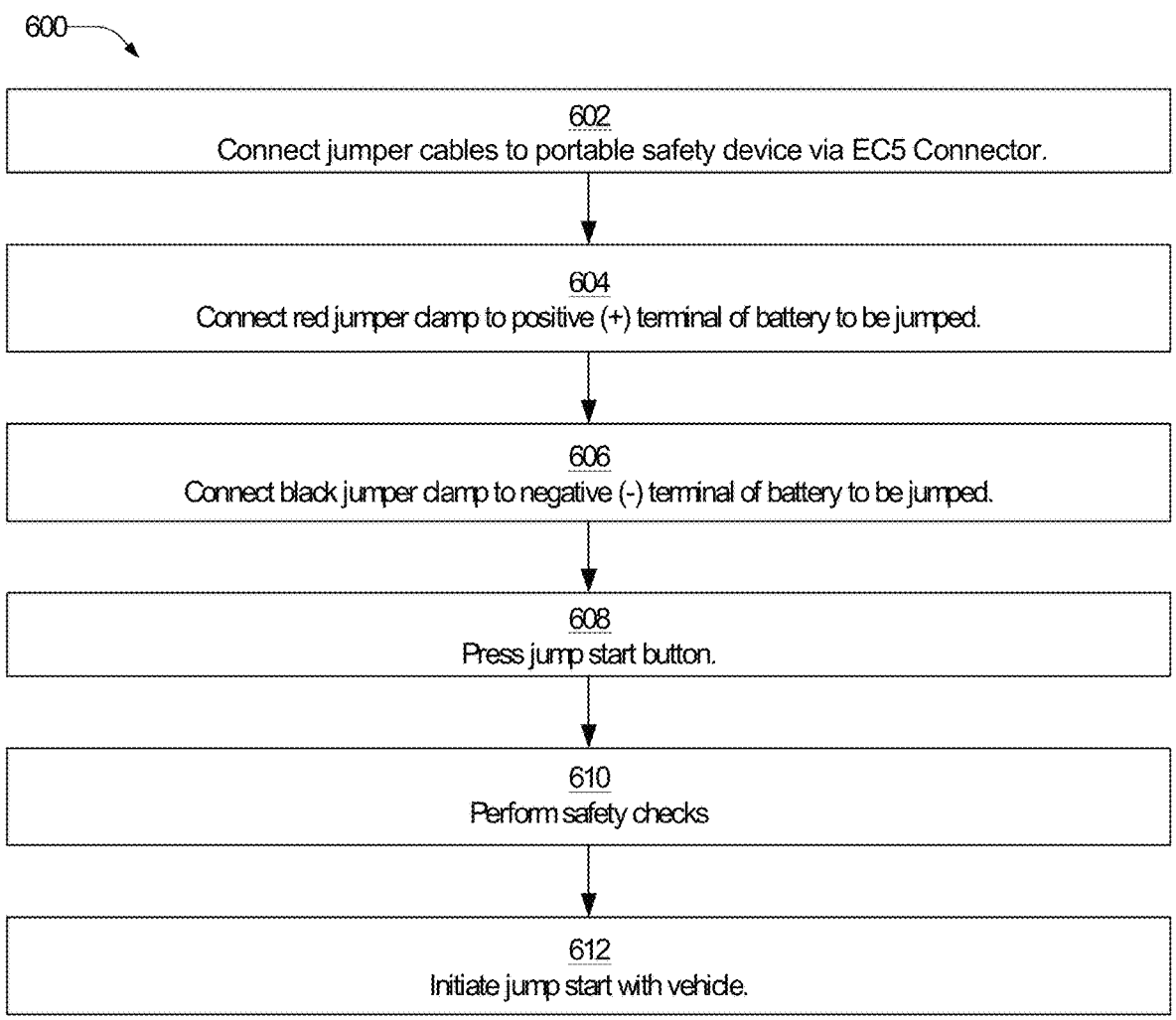
FIG. 6 is a flowchart of a method of using the portable safety device of FIG. 1 to jump start a vehicle.

A method 600 of operating device 10 to jump start a vehicle is described with reference to FIG. 6. Step 602 includes connecting jumper cables to the cable port 18. Step 604 includes connecting the red clamp of the jumper cable to the positive (+) terminal of a vehicle battery to be jumped. Step 606 includes connecting the black clamp of the jumper cable to the negative (−) terminal of a vehicle battery to be jumped.

Step 608 includes pressing the jump start button 20 on the portable safety device 10. In an example of step 608, the button 20 will flash green while the device 10 and the safety circuit 150 performs safety checks. This will last approximately four seconds. Otherwise, the button 20 will rapidly flash red if the clamps of the jumper cables are not correctly connected to the vehicle battery. In this situation, the device 10 should be turned off, the clamps reversed, and then the button 20 should be pressed again.

Step 610 includes performing safety checks. In accordance with preferred embodiments of the portable safety device 10, the safety checks are performed by the safety circuit 150, described in more detail below. In general, the safety circuit 150 is checking for abnormal conditions that can damage the device 10 and any vehicle battery to which the device 10 is connected. For example, the safety circuit 150 can interrupt at least the operative connections of positive and negative charger jacks with the device's power supply if any of a number of shut off conditions occurs, including if there is a reverse polarity condition; the is a reverse current condition; there is insufficient voltage across the positive and negative charger jacks (comprising a measured voltage that is lower than the lower threshold value of a predetermined voltage range); there is excessive voltage across the positive and negative charger jacks (comprising a measured voltage that is higher than the upper threshold value of the predetermined voltage range as correlated with the charging current from the charger battery); or if the temperature of the device battery is too high. In an example of step 610, the jump start button 20 will flash green for approximately 4 seconds. After the safety checks are complete, the green jump start button will stop flashing. Once it is a solid green, it indicates that device 10 is ready to jump start a vehicle. In embodiments, the device 10 will remain in this state for 3 minutes to allow plenty of time to attempt a jump start. If a jump start is not attempted before the 3 minutes has elapsed, device 10 will automatically shut down.

Step 612 includes initiating a jump start of a vehicle. In an example of step 612, a jump start is initiated by attempting to start the vehicle using the regular car ignition which may be, for example, a key or push button. The device 10 allows jump starting current to flow for a maximum of four seconds during the vehicle ignition process. If the vehicle starts, the device 10 will sense this and turn itself off.

Figure 19:
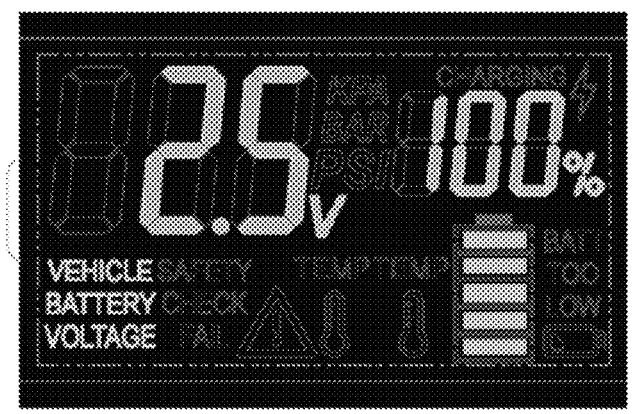
FIG. 19 shows the visual display of FIG. 14 illustrating the display providing the measured voltage level of a vehicle battery to which the portable safety device of FIG. 1 is connected.
Figure 20:
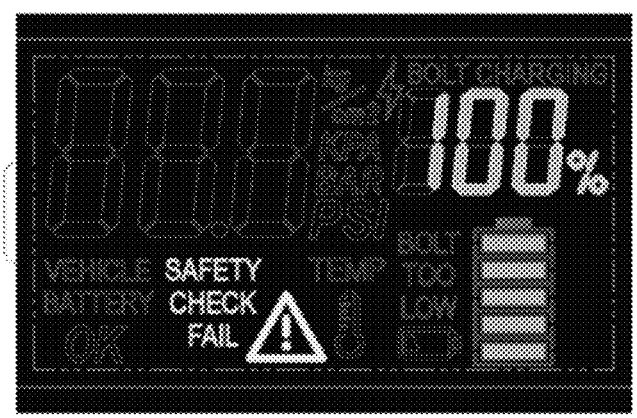
FIG. 20 shows the visual display of FIG. 14 illustrating the display provided when a safety check of the operating conditions has failed.
Figure 21:
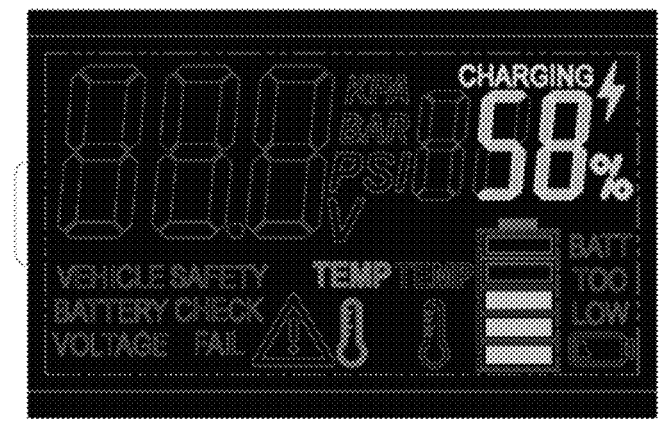
FIG. 21 shows the visual display of FIG. 14 illustrating the display provided when the internal battery operating temperature is too low.

The device 10 may be designed to operate under a variety of conditions. For example, if a user connects to a vehicle battery that reads 13V or higher, the display 32 may display a message such as "Vehicle Battery OK," as illustrated in FIG. 15. Further, if a user connects to a vehicle battery, but does not have at least 50% charge on the internal battery unit 52 inside the device 10, the display 32 may display a message such as "Bolt Battery Low," as illustrated in FIG. 17. If a user connects to a vehicle battery that reads less than 1 VDC+1−0.5V, the display 32 may will display the message "Vehicle Battery Safety Check Fail," as illustrated in FIG. 19. If the user connects to a vehicle battery and the device 10 battery is less than −20° C. or greater than 50° C., the LCD display 32 may display message "Temp" to indicate that battery 52 may not be operated at its current temperature, as illustrated in FIGS. 20-21.

Safety Check

Inside the charger housing 12, the portable safety device 10 houses a charger battery 52 (e.g., a lithium ion type battery), a power supply that is operatively connected with at least one terminal of the internal battery unit 52, with the at least one USB output jack 14 for providing +5V USB power, and with the jumper cable jacks for providing about +12 V DC power, and the safety circuit 50 that operatively connects the power supply with the jumper cable jacks via outlet 18.

Generally, the safety circuit 150 enables operative connection of the jumper cable jacks with the charger battery terminals, in case there is a voltage differential of at least about 11 V across the positive and negative jumper cable jacks. The safety circuit 150 interrupts at least the operative connections of the charger jacks with the internal battery unit 52, in case any of the following shut off conditions occurs: insufficient voltage across the positive and negative charger jacks; reverse polarity of the positive and negative charger jacks; reverse current to the charger battery; or excess temperature of the charger battery 52.

To implement the above-described functionality, the safety circuit 150 initiates a jump start safety check sequence (further described below with reference to FIG. 13) in response to a user actuation of the jump start button 20. Upon successful completion of the jump start safety check sequence, the portable safety device 10 provides 12 V DC current from the battery unit 52 to the charger jacks via output port 18. Moreover, upon completion of the jump start safety check sequence the device 10 remains ready to provide 12 V DC current during a pre-determined period of time. For example, during the pre-determined period of time the device 10 provides 12 V DC current from the charger battery 52 to the charger jacks in response to a second user actuation of the jump start button 20. For example, the pre-determined period of time is sufficient for three discrete jump start attempts. According to certain embodiments, the device 10 discontinues readiness after three discrete jump start attempts.

Referring to FIGS. 8-12, the safety circuit 150 comprises a jump start relay 152, a microprocessor 154, a voltage input analyzer 156, a differential voltage amplifier 158, a reverse polarity detector 160, a reverse current protector 162, and a thermistor 164 that are operatively connected with the microprocessor 154 to enable or disable the jump start relay.

More particularly, a port PD1 of the microprocessor 154 is operatively connected to actuate a transistor 166, which energizes or de-energizes the jump start relay 152. The microprocessor 154 also is configured to execute instructions and to carry out operations associated with the portable safety device 10. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with power indicator means, such as LCD display 32, in order to display information for how much capacity is remaining in the internal rechargeable battery unit 52 and whether the device 10 needs to be connected to an external power source for recharging.

Figure 8:
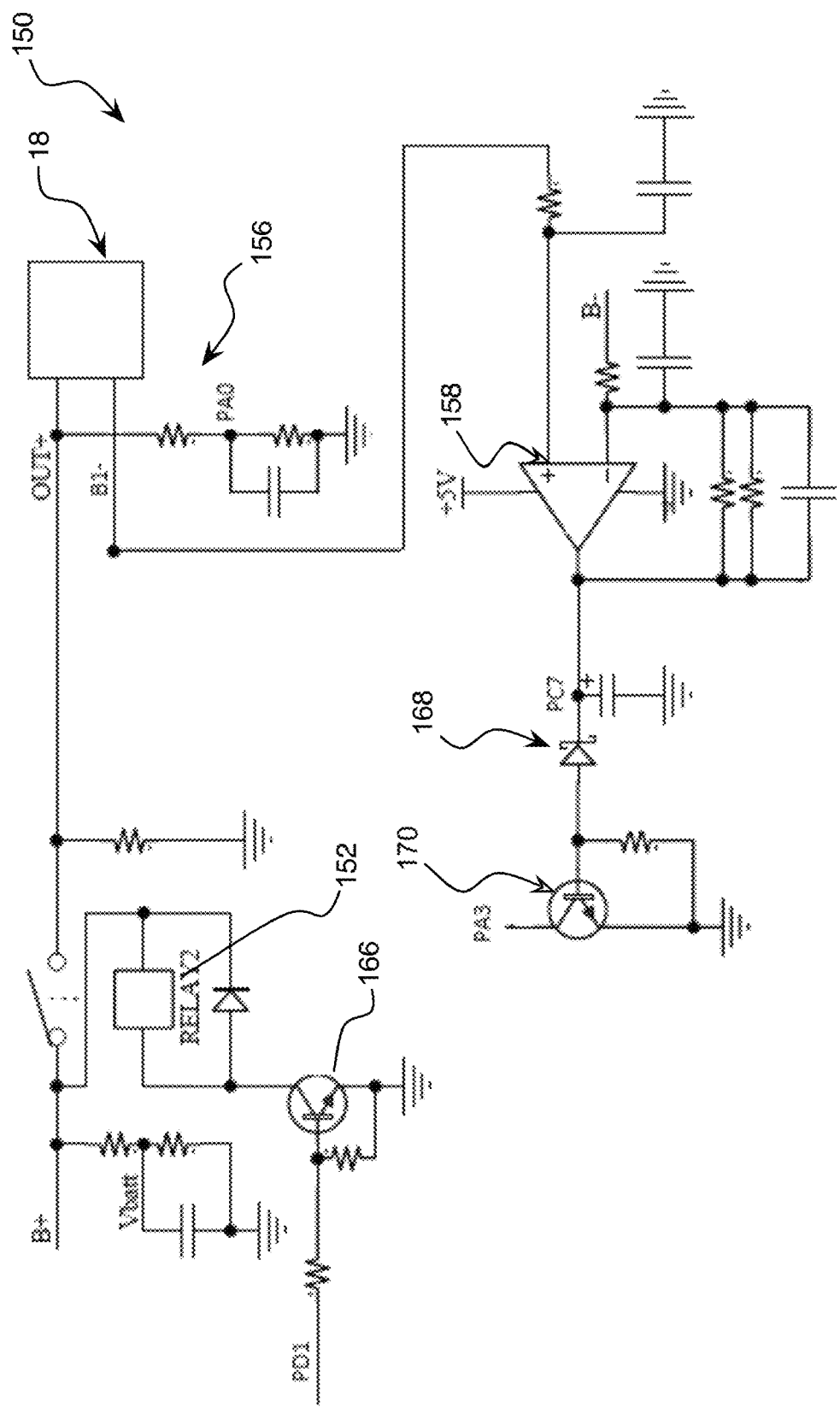
FIG. 8 shows a safety circuit schematic for the portable safety device of FIG. 1.

FIG. 8 shows the voltage input analyzer 156, which is operatively connected between the jumper cable jacks. The voltage input analyzer 156 includes a voltage divider so that it sends to a port PA0 of the microprocessor 154 a fraction of the voltage across the terminals of a vehicle battery to be charged. In case there is a sufficient voltage differential (the jumper cable jacks are connected to a battery), then the fractional voltage from the voltage input analyzer 156 will cancel a default LOW signal at microprocessor port PA0 with the result that the microprocessor 154 will have one of the inputs required in order to energize or enable the jump start relay 152. Thus, the safety circuit 150 can enable the operative connection of the jumper cable jacks to the internal battery unit 52, only if the battery voltage is satisfactory.

FIG. 8 also shows the differential current amplifier 158, which compares the negative terminal voltages of the battery unit 52 and of the vehicle battery to be charged, and sends a HIGH signal to port PC7 of the microprocessor 154 in case the charging current exceeds a tolerance threshold. Moreover, in case the differential current amplifier output exceeds a breakthrough voltage of a Zener diode 168, then the output gates a transistor 170 to cause a LOW signal at port PA3 of the microprocessor 154. These two signals disable the microprocessor from energizing or enabling the jump start relay 152. Thus, the safety circuit 150 can enable the operative connection of the jumper cable jacks to the battery unit 52, only if the negative terminal voltages match within the pre-determined tolerance threshold.

FIG. 9 shows the microprocessor 154, which includes the following ports:

PA3: A/D port battery temperature detection;
PA2: A/D port battery voltage detection;
PA1: ADI 5V USB current detection;
PA0: Out-check external voltage detection;
VSS: GND;
PC6: V2 charging voltage detection;
PC7: V4 battery current output detection;
PC0: V5 charging voltage and battery voltage detection;
PC1: V3 back to the charging current detection;

PD0: on/off port;
PD1: relay control port;
PB0: reverse battery detection;
PB1: LED on/off control;
PB2: jump bottom control;
PB3: light bottom control;
PB4: jump green light control;
PB5: jump red light control;
PD2: on/off light control;
PD3: USB output control;
PC2: on/off bottom voltage control;
PWM1: PWM signal output;
PC4: LED battery indicator control;
VDD: VCC; and
PA6-PA4: LED battery indicator control.

FIG. 10 shows the reverse polarity detector 160, which may include a light emitting diode 172 that is connected in electrical series between ground and the positive jumper cable jack, and may also include a phototransistor 174 in optical communication with the light emitting diode and connected in electrical series between ground and a reverse polarity detection terminal PB0 of the microprocessor 154. In case the jumper cables are connected backwards, i.e. the positive jumper cable jack is connected to a negative terminal of the vehicle battery to be charged, then reverse polarity will be detected by energization of the light emitting diode 172 and corresponding conduction by the phototransistor 174. This will cause a LOW signal at the microprocessor port PB0, which will cancel the inputs required in order to energize or enable the jump start relay 152. Thus, the safety circuit 150 disables the operative connection of the jumper cable jacks to the battery unit 52, in case the jumper cable jacks are connected backwards to the vehicle battery.

FIG. 11 shows the reverse current protector 162, which may incorporate an operational amplifier 176 operatively connected between the battery unit 52 negative terminal and the negative jumper cable jack. In case the voltage differential across the op amp 176 reverses, then the reverse current protector 162 sends a HIGH signal to port PC1 of the microprocessor 154, which will cancel the inputs required in order to energize or enable the jump start relay 152. Thus, the safety circuit 150 disables the operative connection of the jumper cable jacks to the battery unit 52, in case the vehicle battery begins to send current back through the battery unit 52.

FIG. 12 shows the thermistor 164 (or equivalent temperature-sensing circuitry) is mounted adjacent the battery unit 52 and is operatively connected with the microprocessor 154 to provide a LOW signal at PA5 in case the internal battery temperature exceeds a pre-determined threshold. Thus, the safety circuit 150 disables the operative connection of the jumper cable jacks to the battery unit 52, in case the charger battery exceeds a pre-determined temperature.

Figure 13:
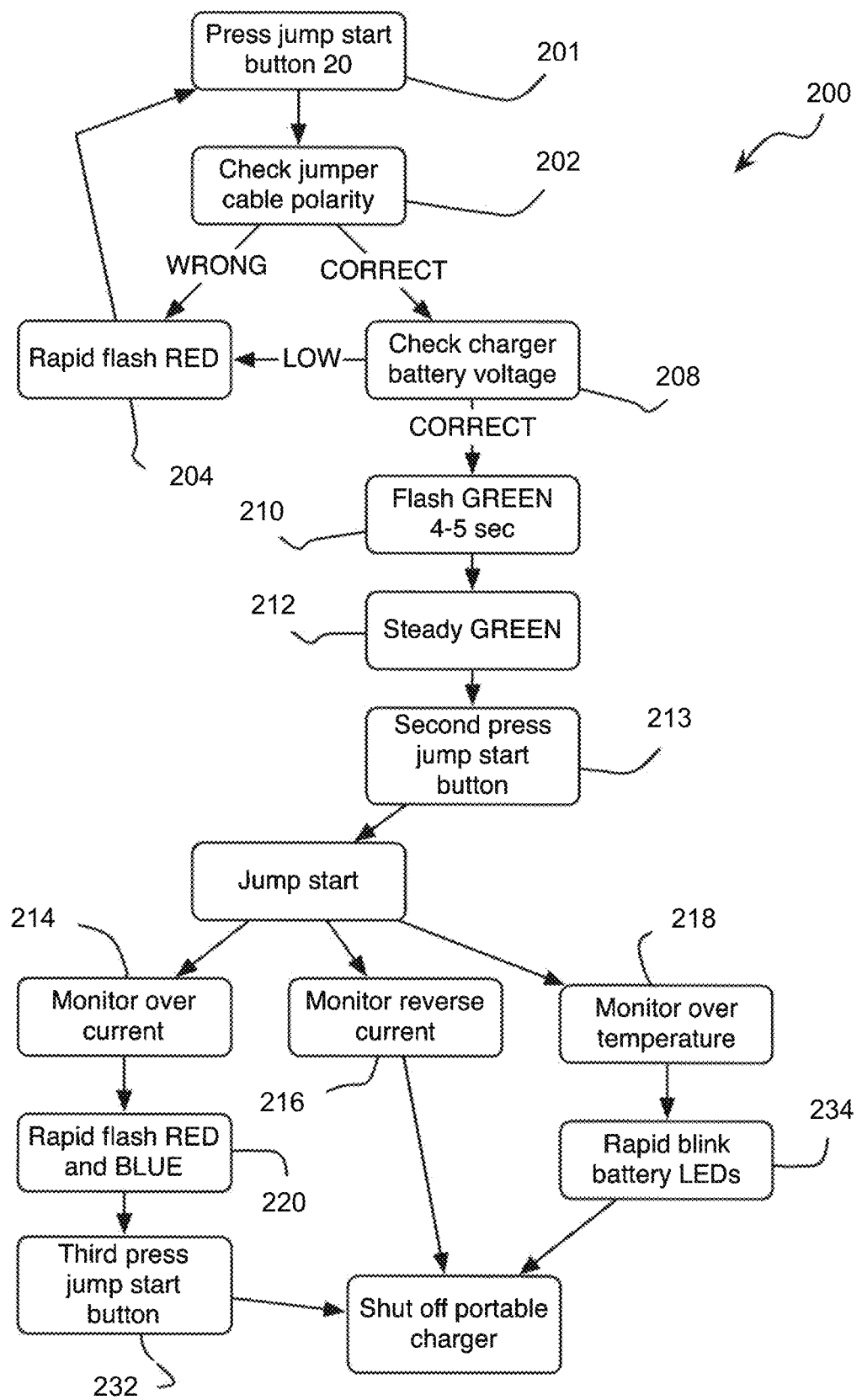
FIG. 13 shows a flowchart illustrating a safety check sequence for use of the portable safety device of FIG. 1 to charge a car battery.

FIG. 13 shows a flowchart of the jump start safety sequence 200. At a step 201, press the jump start button 20 on the portable safety device 10. Pressing the jump start button 20 initiates the jump start safety check sequence 200. At step 202, the safety circuit 150 checks jumper cable polarity using the reverse polarity detector 160. The jump start button 20 will rapidly flash 204 RED if cables are not connected correctly. If cables are correctly connected, then the safety circuit 150 will check 208 for adequate internal battery voltage using the voltage input analyzer 156. The voltage input analyzer circuit 156 sends signals to pins PA0, PC5 of the microprocessor 154, which receives the fractional voltage from the battery positive terminal in order to assess the voltage differential from the charger battery positive terminal to the negative terminal of the battery that the portable charger 10 will be used to jump start. If a voltage is not detected, the safety circuit 150 will signal the microprocessor 154 to disable the jump start relay 152. On the other hand, if the microprocessor 154 senses at least a minimum voltage differential, it will then enable the jump start relay 152.

Thus, in case internal battery voltage also is satisfactory, then the jump start button 20 will flash 210 GREEN for about 4 seconds if the jump start cables are correctly connected from the jumper cable jacks to the vehicle battery to be charged. Then after 4-5 seconds the portable safety device 10 will enter 212 jump start ready state. When the jump start button 20 goes from flashing GREEN to steady GREEN the portable charger is ready to attempt a car start.

The microprocessor 154 will maintain the safety circuit 150 and the portable device 10 in a state of readiness for jump start during a pre-determined period of time (e.g., up to 5 minutes) in order to allow for multiple attempts to jump start (e.g., at least three attempts). In case a jump start is not attempted before the 5 minutes has elapsed, then the microprocessor 154 will shut down the device 10 by disabling the relay 152. On the other hand, in case a jump start is attempted and the engine fails to start, the microprocessor 154 will permit a pre-determined number of attempts (e.g., total of 3) before turning off the device 10.

From the jump start ready state, charging can be initiated by a second press 213 of the jump start button 20. Once charging has been initiated, the safety circuit 150 continuously monitors 214 for over current using the differential current amplifier 158 and also monitors 216 for reverse current using the reverse current protector 162.

In case the current draw from the internal battery unit 52 is over 30 A for more than 30 seconds during a jump start, the safety circuit 150 will rapidly flash 220 the jump start button 20 red and the power button 30 blue. Design peak current draw for jump starting, running car lights, accessories, etc. is about 70 A. Therefore, on detecting a successful start, the microprocessor 154 will allow a current draw up to 70 A for up to 4 seconds.

In case the jump start button 20 is indicating a rapid flash RED, then a user can press the jump start button a third time 232 to shut off the portable safety device 10. The user then can check cable connections and can press 201 the jump start button 20 again to restart the jump start safety check sequence.

Additionally, the safety circuit 150 monitors 218 for over temperature using the thermistor 164. In case the portable safety device 10 senses an over temperature condition of the battery unit 52, all four battery charge level LEDs will blink 234 rapidly for several seconds. The jump start sequence will be disabled until the battery unit 52 has cooled to a safe temperature range, i.e. less than about 65° C.

Floodlight Operation

In embodiments, another output of the portable safety device 10 includes floodlight 38, which may include several dual-function white and red LEDS having an available power of approximately 0.5 Watts. The use of dual-function LEDs allows floodlight 38 to have a variety of operating modes. Pressing ON/OFF switch 40 toggles floodlight 38 through various color and function cycles. When floodlight 38 is powered-on, battery level indicators on display 32 will identify the charge capacity of battery 52. Examples of operating modes include:

Floodlight White—On Mode: This mode is entered after pressing ON/OFF switch 40 once while in Off Mode.

Floodlight Red—On Mode: This mode is entered after pressing ON/OFF switch 40 a second time while in On Mode.

Emergency SOS Red—On Mode: This mode is entered after pressing ON/OFF switch 40 a third time while in On Mode.

Light-Off Mode: This mode is entered after pressing ON/OFF switch 40 a fourth time while in On Mode.

In embodiments, the floodlight 38 may shut off automatically after a period of use, for example, 2 hours. Further, the floodlight 38 will automatically power off once it detects that battery 52 cannot provide adequate power. For example, hardware protection may provide a low voltage cutoff of approximately 2.7V+1−50 mV for each individual battery cell and software protection may provide low voltage cutoff of approximately 9V+1−0.3V.

Air Compressor Operation

In embodiments, another output of the portable safety device 10 comprises the air compressor 56 and hose 34. The inclusion of an air compressor function may allow the portable safety device 10 to inflate various items such as car/truck, bike and motorcycle tires. In addition, it may be used to inflate balls, rafts and other inflatable objects.

Air compressor 56 output through hose 34 may be initiated by pressing any of the buttons in air compressor controls 28. A user may select a preferred unit of pressure (PSI, BAR, KPA or kg/cm2) using UNIT button 29. A pressure set point can by pressing the pressure up button 31 or pressure down button 27 in air compressor controls 28. When ON/OFF button 30 is pressed while display 32 is on, air compressor 56 will be turned on. While air compressor 56 is on, display 32 may display the charge capacity of the battery 52. Once the pressure set point is reached, the air compressor will automatically stop inflating. In embodiments, the air compressor 56 may provide a maximum pressure output of 100 PSI with an operating temperature of −20° C. to 60° C.

Buttons in the air compressor controls 28 may provide functionality to control the air compressor 56 in a variety of ways. In embodiments, a "unit" button may by pressed repeatedly to select the pressure units. Further buttons marked with "+" or "−" may utilize a short press to select the desired pressure slowly and a long press to select the desired pressure rapidly. Display 32 may be shut off automatically after 60 seconds of no activity. The air compressor 56 may stop inflating automatically once the set pressure is reached with a tolerance +/−1 PSI. In embodiments, a thermistor may be placed on the air compressor piston cylinder/motor and device 10 may be shut off automatically after temperature reaches 90° C.

Figure 7:
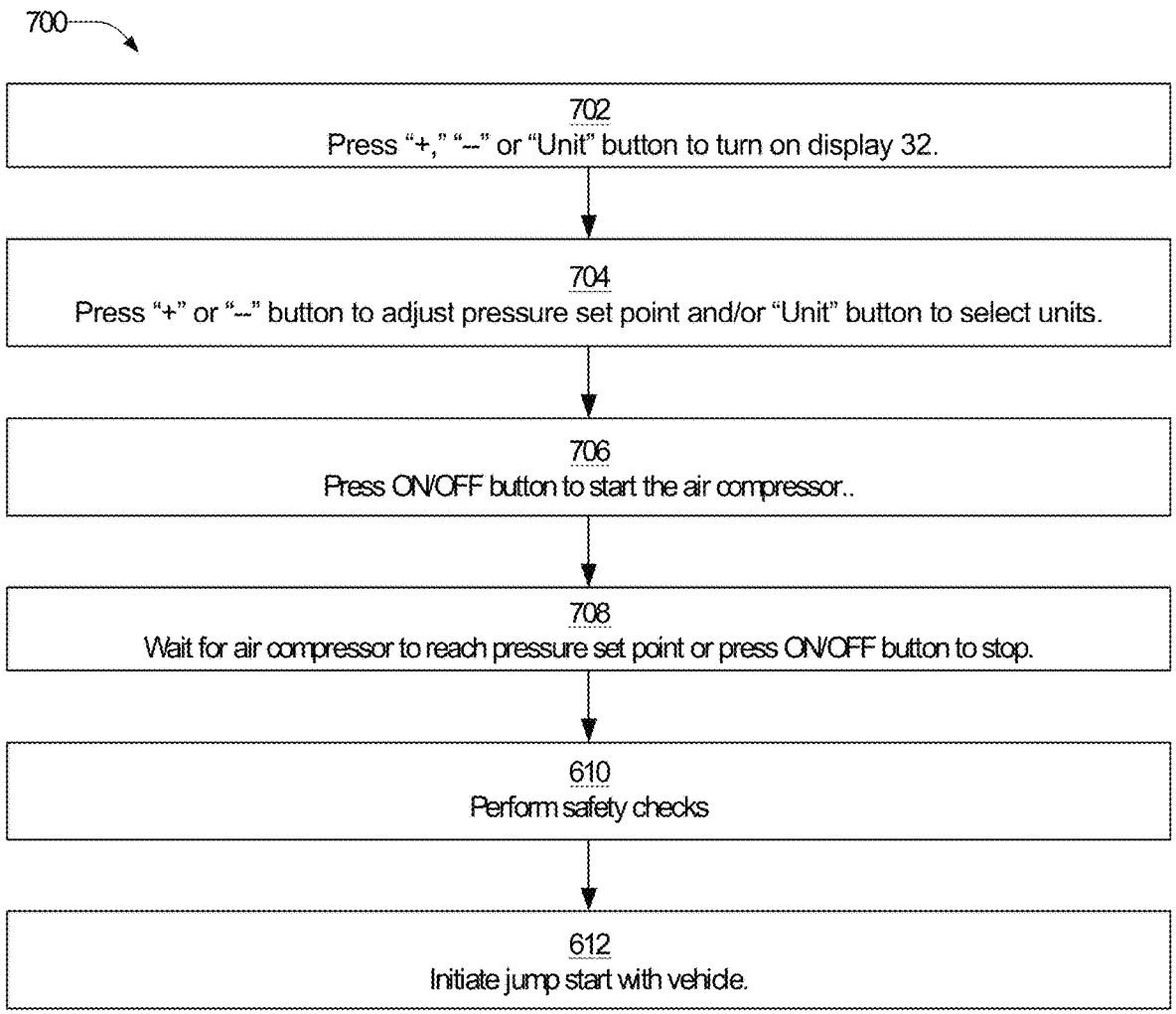
FIG. 7 is a flowchart of a method of using the portable safety device of FIG. 1 for inflation of an inflatable object, such as a vehicle tire.

A method 700 of operating the air compressor 56 of the portable safety device 10 is described with reference to FIG. 7. Step 702 includes turning on display 32 to allow entry of air compressor parameters. In an example of step 702, a user may turn on display 32 by pressing any of the buttons in air compressor controls 28.

Step 704 includes adjusting the operative parameters of the air compressor 56. In an example of step 704, pressing the + or − button again, will allow the user to adjust the pressure set point. In embodiments, PSI will be the default unit, however, pressing the Unit button allows selection from several unit options. Slow pressing button 27 or button 31 may allow the user to set the desired pressure slowly. Long pressing button 27 or button 31 may allow the user to set the desired pressure rapidly.

Step 706 includes starting the air compressor 56. In an example of step 706, the LCD display screen 32 is on. Pressing the ON/OFF button 30 a second time will start the air compressor 56. Pressing the ON/OFF button 30 a third time will stop the air compressor 56 and shut off the LCD display screen 32. Inflation may be stopped manually by pressing the ON/OFF button, or inflation will stop once the pressure set point is reached. The expected pressure tolerance is +/−1 PSI. In embodiments, once the LCD display screen 32 is on, a 60-second timer will automatically shut off the LCD display 32 if there is no further activity or if a preferred pressure set point has been reached. The only exception to this is if the air compressor 56 is running.

LCD Display

FIGS. 14-26 illustrate a visual display of the portable safety device 10 in accordance with embodiments of the present invention in the form of the LCD display screen 32. The LCD screen 32 provides the user with salient information relating to operation of the device 10, such as the charge level of the internal battery unit 52, whether the device 10 is set for charging, whether any safety concerns have been triggered, and the operational specifications of the air compressor 56, in use.

When the portable safety device 10 is powered on, the LCD screen 32 will identify the charge capacity of the internal battery unit. Similarly, when a jump start sequence is initiated by pressing the "JUMP START" button 20, the LCD display 32 will activate and display the vehicle battery voltage. Then the LCD display 32 will display the battery charge level of the device 10. Additionally, once the user sets any pressure setting or unit setting for the air compressor 56, the same pressure setting and unit configured by the user will be recalled and displayed the next time the LCD display screen 32 is turned on.

As noted, the LCD display 32 will provide the battery charge level of the internal battery unit 52. For example, FIG. 15 shows the visual display 32 provided when the internal battery unit 52 is fully charged and ready for all uses. FIG. 16 shows an example of the visual display 32 provided when the internal battery unit 52 is partially charged. Lastly, FIG. 17 shows the visual display 32 provided when the internal battery unit 52 is low.

FIG. 18 shows the visual display 32 provided when the internal battery unit 52 is charging. While charging, the LCD digital display 32 will represent the appropriate charge percentage along with the "CHARGING" characters and icon. More particularly, the word "CHARGING" and a bolt icon will be solid (i.e., lit up) during the charging process. The fuel gauge bar will also flash based on the charge level.

Figure 14:
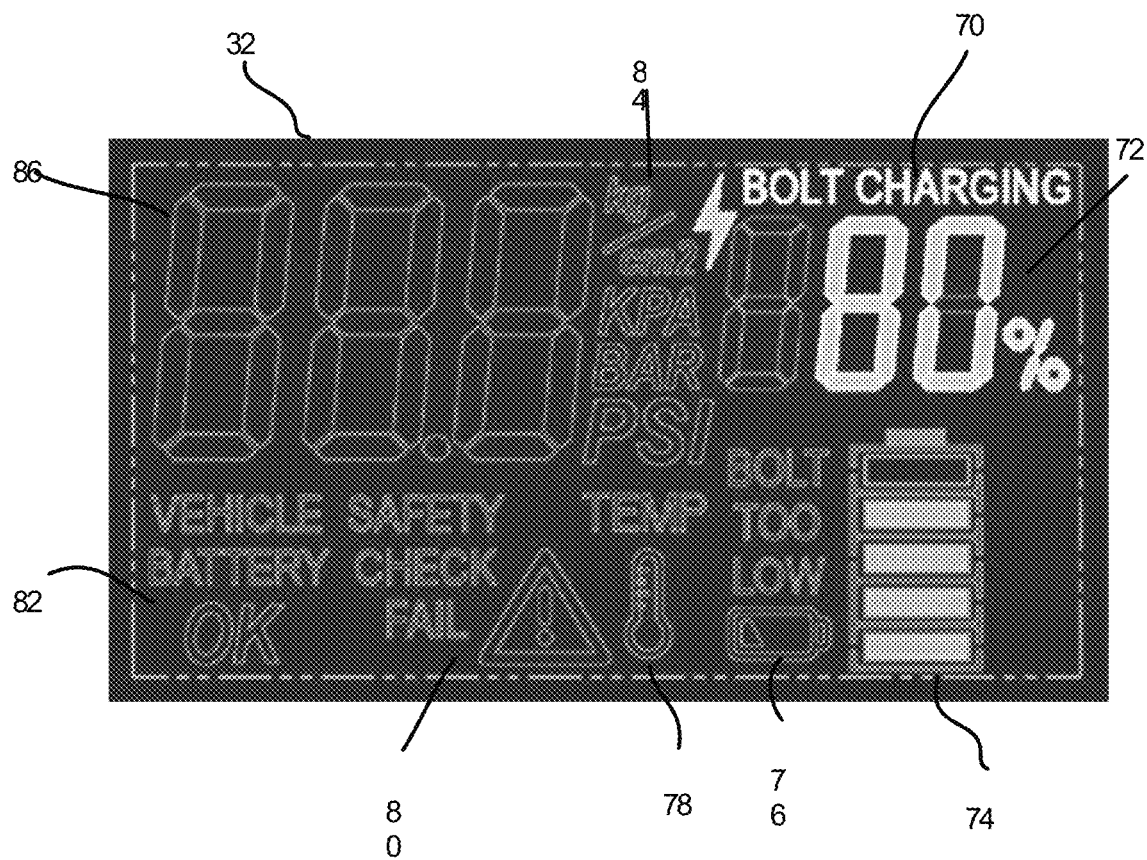
FIG. 14 illustrates a visual display of the portable safety device of FIG. 1, in accordance with embodiments of the present invention.

FIG. 19 shows the visual display of FIG. 14 illustrating the display providing the measured voltage level of a vehicle battery to which the portable safety device 10 is connected. For example, when the vehicle battery voltage is between 1.0V (+/−0.5V) to 12.8V (+/−0.3V) and the battery capacity of the device 10 is greater than 50%, then once the jumper cable clamps are connected to the vehicle battery, the LCD display 32 will automatically display the "VEHICLE BATTERY VOLTAGE" indicator and voltage value of the vehicle battery. Subsequently, pushing the jump start button 20 will trigger the jump start sequence and illuminate the jump start button flashing green (safety check), which will become a solid green after 4 seconds. Once the jump start button is solid green, the "VEHICLE BATTERY VOLTAGE" indicator on the LCD display 32 will disappear, and the voltage value on the display 32 will represent the voltage level of the internal battery unit 52 of the device 10. After the jump start attempt, the jump start button will turn off and the "VEHICLE BATTERY VOLTAGE" indicator will reappear and the voltage value displayed will represent an updated voltage for the vehicle battery. The voltage meter will generally measure an external voltage between about 0.2V and 25.5V DC.

FIG. 20 shows the visual display of FIG. 14 illustrating the display provided when a safety check of the operating conditions has failed. For example, if the safety circuit 150 detects a reverse polarity condition, the "SAFETY CHECK FAIL" icon will appear on the LCD digital display 32. This screen will also be displayed if there is a reverse current condition, or if the vehicle battery voltage is too high or too low.

Additionally, the device 10 will be able to determine if the jumper cable clamps are not properly connected to the vehicle battery. For example, when the device 10 is disconnected from the vehicle battery and the charge level of the internal battery unit 52 is greater than 50%, the LCD display 32 will display the "VEHICLE BATTERY VOLTAGE" indicator and display 0.0V. After 30 second, a "SAFETY CHECK FAIL" icon will appear and stay on for 60 seconds before shutting off automatically. If the device 10 is disconnected from the vehicle battery and the charge level of the internal battery unit 52 is less than 50%, the LCD display 32 will display the "VEHICLE BATTERY VOLTAGE" indicator and display 0.0V, and also display the "BATT TOO LOW" indicator.

Figure 22:
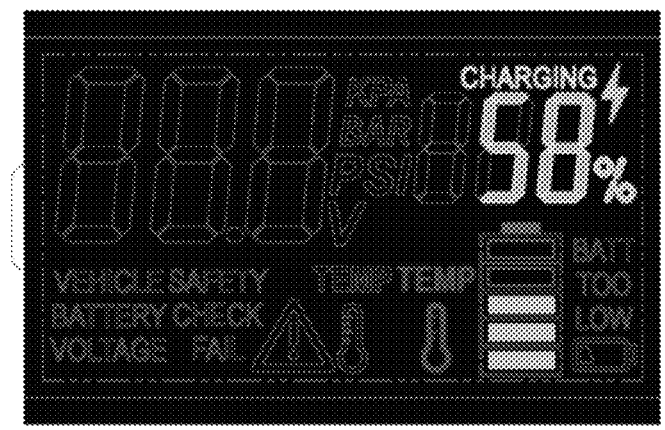
FIG. 22 shows the visual display of FIG. 14 illustrating the display provided when the internal battery operating temperature is too high.
Figure 23:
FIGS. 23-26 show the visual display of FIG. 14 illustrating various displays provided when operating the air compressor of the portable safety device of FIG. 1.
Figure 24:
Figure 25:
Figure 26:
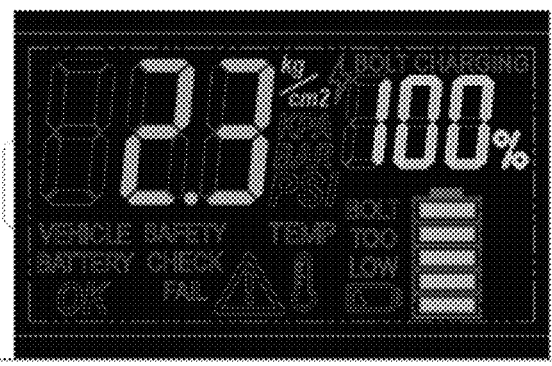

FIGS. 21 and 22 show the visual display 32 provided when the internal battery operating temperature is either too low or too high, respectively. For example, if a user attempts to charge or otherwise use the device 10 when the temperature sensor detects an internal battery operating temperature outside the range of 0° C. and 45° C., the LCD digital display 32 will show the appropriate "Temp" icon. For example, if the temperature of the internal battery unit 52 is too low (i.e., below 0° C.), then the blue "Temp" icon will be displayed. If the temperature of the internal battery unit 52 is too high (i.e., above 45° C.), then the red "Temp" icon will be displayed. Moreover, the "Temp" icon will flash if the device 10 is attempting to be used when the battery temperature is outside the prescribed range.

If the pressure hose 34 associated with the air compressor 56 is connected to an inflatable device, the LCD screen 32 will display the pressure reading of the inflatable device once the LCD screen 32 is turned on. If no further buttons are pressed, the LCD screen 32 will automatically shut off after 60 seconds. FIGS. 23-26 show version of the visual display 32 provided when operating the air compressor 56 of the portable safety device 10 of FIG. 1.

Additional Operational Considerations

A portable safety device 10 includes several components that require power from the internal battery unit 52 as described herein. It is important to manage access to the battery 52 by these components so that device 10 is not damaged. FIG. 9 shows a state diagram illustrating a set of criteria for simultaneous operation of components, but this set is only one way that device 10 and battery 52 may be protected from damage. Other criteria are contemplated.

Components illustrated in FIG. 9 include floodlight 902, external power source charging 904, USB charging 906, air compressor 908 and jump start 910.

As shown in FIG. 9, if floodlight 902 is active, all other components will operate. If the device 10 is charging 904, floodlight 902 and USB charging 906 may be functional.

If USB charging 906 is active, floodlight 902 and charging 904 may be function. If the air compressor 908 or jump start 910 are active, only floodlight 902 may be functional.

Although exemplary embodiments of the invention have been described with reference to attached drawings, those skilled in the art nevertheless will apprehend variations in form or detail that are consistent with the scope of the invention as defined by the appended claims.

What is claimed is:

1. A portable safety device comprising:
a housing having a recessed area defining a storage cavity;
a battery disposed within the housing;
a plurality of ports disposed in the housing, said plurality of ports further comprising a port for a jump start cable and at least one charging port;
an air compressor disposed within the housing and operatively connected with the battery;
a hose operatively coupled to the air compressor through a hinge,
wherein the storage cavity of the housing is configured to retain the hose and the hinge is disposed within the storage cavity; and
a controller for controlling the operation of the portable safety device.

2. The portable safety device of claim 1, further comprising a display for displaying at least a charge capacity of the battery and a plurality of control buttons.

3. The portable safety device of claim 2, wherein at least one of the plurality of control buttons is used to set at least one operating parameter for the air compressor.

4. The portable safety device of claim 3, wherein at least one operating parameter includes a pressure set point and the air compressor automatically stops inflating when it reaches the pressure set point.

5. The portable safety device of claim 3, wherein the air compressor is capable of producing an air pressure of approximately 100 PSI.

6. The portable safety device of claim 3, wherein the air compressor will automatically shut off when a charge level of the battery drops below a set value.

7. The portable safety device of claim 1, wherein the charging port further comprises a USB (universal serial bus) port.

8. The portable safety device of claim 1, wherein the port for a jump start cable further comprises an EC5 connector.

9. The portable safety device of claim 8, wherein the controller performs at least one safety check before allowing a jump start operation.

10. The portable safety device of claim 9, wherein the controller activates an indicator when the at least one safety check is completed successfully and causes the portable safety device to provide current for a maximum of four seconds when a jump start operation is initiated.

11. The portable safety device of claim 1, wherein the battery further comprises a 11.1 V lithium polymer battery.

12. The portable safety device of claim 1, further comprising a floodlight disposed in the housing.

13. The portable safety device of claim 12, wherein the floodlight may be operated in a plurality of modes.

14. The portable safety device of claim 1, wherein, the hose storage cavity has slot shape.

15. The portable safety device of claim 14 wherein the hose storage cavity wraps around a corner of the housing.

16. The portable safety device of claim 15, wherein the air compressor is capable of producing an air pressure of approximately 100 PSI but automatically stops inflating when it reaches a pressure set point configurable through at least one control button.

17. The portable safety device of claim 16, wherein the air compressor will automatically shut off when a charge level of the battery drops below a set value.

18. The portable safety device of claim 16 further comprising reverse polarity protection apparatus coupled to the port for the jump start cable.

\* \* \* \* \*